United States Patent [19]

Gulette et al.

[11] Patent Number: 4,721,269
[45] Date of Patent: Jan. 26, 1988

[54] SHOULDER BELT COMFORT FEATURE RELEASE

[75] Inventors: Ronald S. Gulette, Farmington Hills; James A. Gavagan, Centerline, both of Mich.

[73] Assignee: Irvin Industries Incorporated, Rochester Hills, Mich.

[21] Appl. No.: 852,541

[22] Filed: Apr. 16, 1986

[51] Int. Cl.⁴ .................................................. B60R 22/34
[52] U.S. Cl. ............................... 242/107.7; 280/807; 280/808
[58] Field of Search ............. 242/107.7, 107.6, 107.12; 280/801, 802, 803, 807, 808; 297/474, 475

[56] References Cited

U.S. PATENT DOCUMENTS

| | | | |
|---|---|---|---|
| 4,307,853 | 12/1981 | Higbee et al. | 242/107.7 |
| 4,343,445 | 8/1982 | Ocker et al. | 242/107.7 |
| 4,385,737 | 5/1983 | Gulette et al. | 242/107.7 |
| 4,391,421 | 7/1983 | Naitoh et al. | 242/107.7 |
| 4,498,642 | 2/1985 | Doty | 242/107.7 X |
| 4,498,689 | 2/1985 | Duffield et al. | 242/107.7 X |
| 4,540,137 | 9/1985 | Rogers et al. | 242/107.7 X |

*Primary Examiner*—John M. Jillions
*Attorney, Agent, or Firm*—Lloyd M. Forster

[57] ABSTRACT

Combination lap and shoulder belt restraining system, including a mounting frame with belt windup spool and with comfort feature release means for automotive vehicle occupant, responsive to tension lap belt engagement independent of belt spool rotation for enabling the comfort feature, and to relaxation of tension by lap belt disengagement independent of belt spool rotation for releasing the comfort feature to thereby assure belt retraction upon occupant leaving the vehicle.

9 Claims, 10 Drawing Figures

RETRACTED POSITION

4,721,269

SHOULDER BELT COMFORT FEATURE RELEASE

BACKGROUND OF THE INVENTION

Combination lap and shoulder belt restraint systems which employ spring retractors for spool wound belt webbing are conventionally provided with "comfort features" which relax shoulder belt tension from an initial snug position by a slight manual extension where it is retained against spring retraction. The release of such comfort feature to permit complete belt retraction is required upon the occupant leaving the vehicle in order to avoid a loose belt hanging outside the door. U.S. Pat. No. 4,002,311 discloses a solenoid mechanism responsive to release of the belt latch. Various plunger mechanisms responsive to door opening are also conventionally employed to release the comfort feature and assure complete belt retraction upon door opening. The installation of such mechanisms is somewhat complex in addition to expense of the mechanism per se. Furthermore, exposure of plungers to door opening, outside weather conditions and accidental damage has resulted in certain undesirable maintenance problems.

The availability of the lap belt anchor with its proximity to the conventional comfort feature mechanism has not heretofore, to the best of applicant's knowledge, been utilized as a mechanical means for releasing the comfort feature whenever the lap belt is disengaged in order to thereby circumvent the disadvantages of electric solenoids and conventional remote door actuated plungers currently employed in most automotive vehicles equipped with shoulder harness comfort features.

BRIEF DESCRIPTION OF THE INVENTION

The present invention provides lap belt responsive comfort feature release means for combination shoulder and lap belt restraint systems for automotive vehicle occupants. Loosening of the lap belt frees the lap belt anchor for pivotal rotation by tension spring actuating mechanism to disengage the comfort feature follower from its operative position. Reengagement of the lap belt with its normal restraining tension reverses the anchor pivotal movement to withdraw the disengaging mechanism against the bias of spring tension permitting the comfort feature follower to resume its operative position.

The lap belt responsive control renders unnecessary the provision of an electric solenoid or door responsive plunger such as conventionally employed to assure full belt retraction upon the occupant leaving the vehicle.

DETAILED DESCRIPTION OF A FIRST EMBODIMENT

Figure 1:
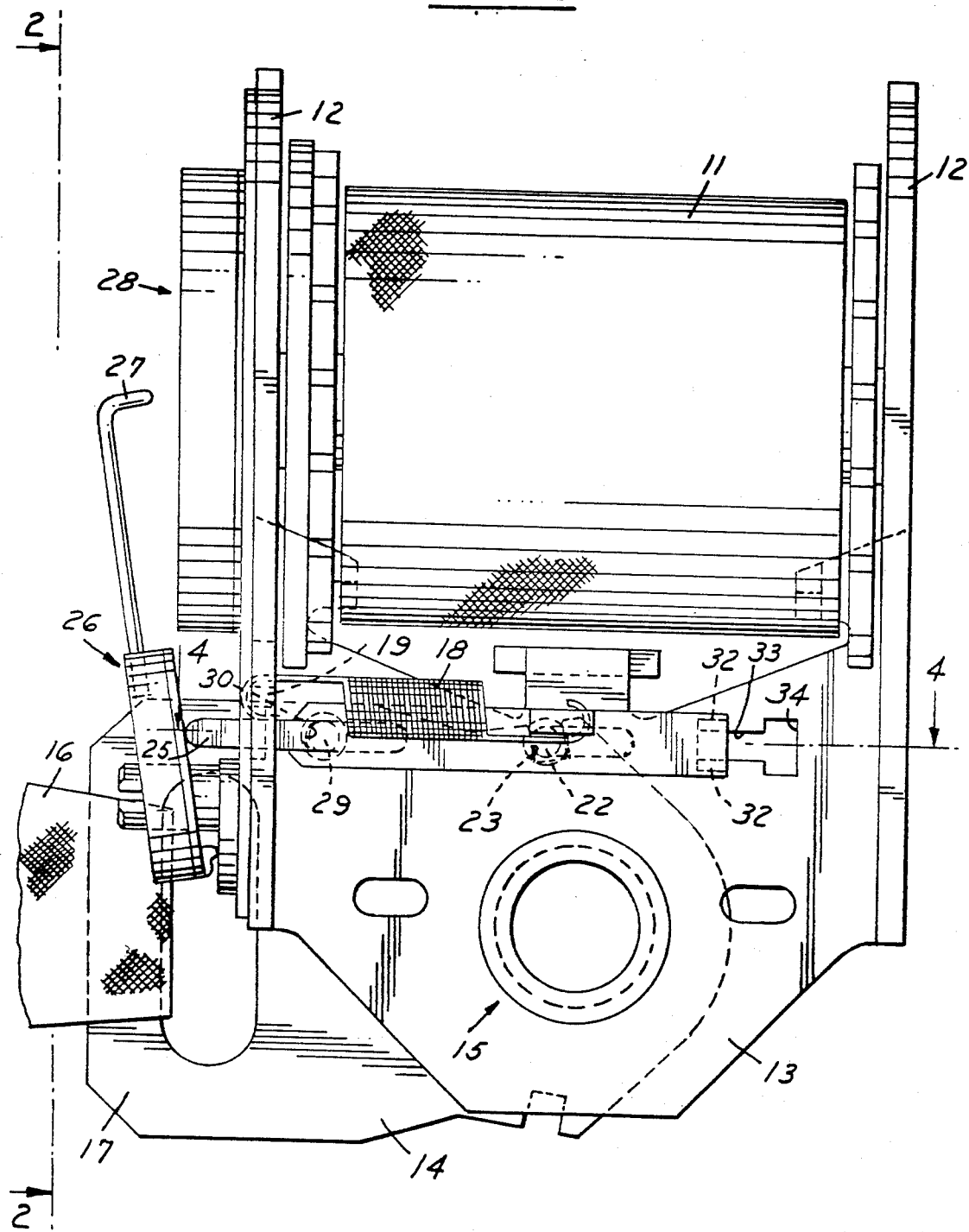
FIG. 1 is a front elevation of a belt retractor spool frame illustrating the comfort feature follower in disengaged position.
Figure 2:
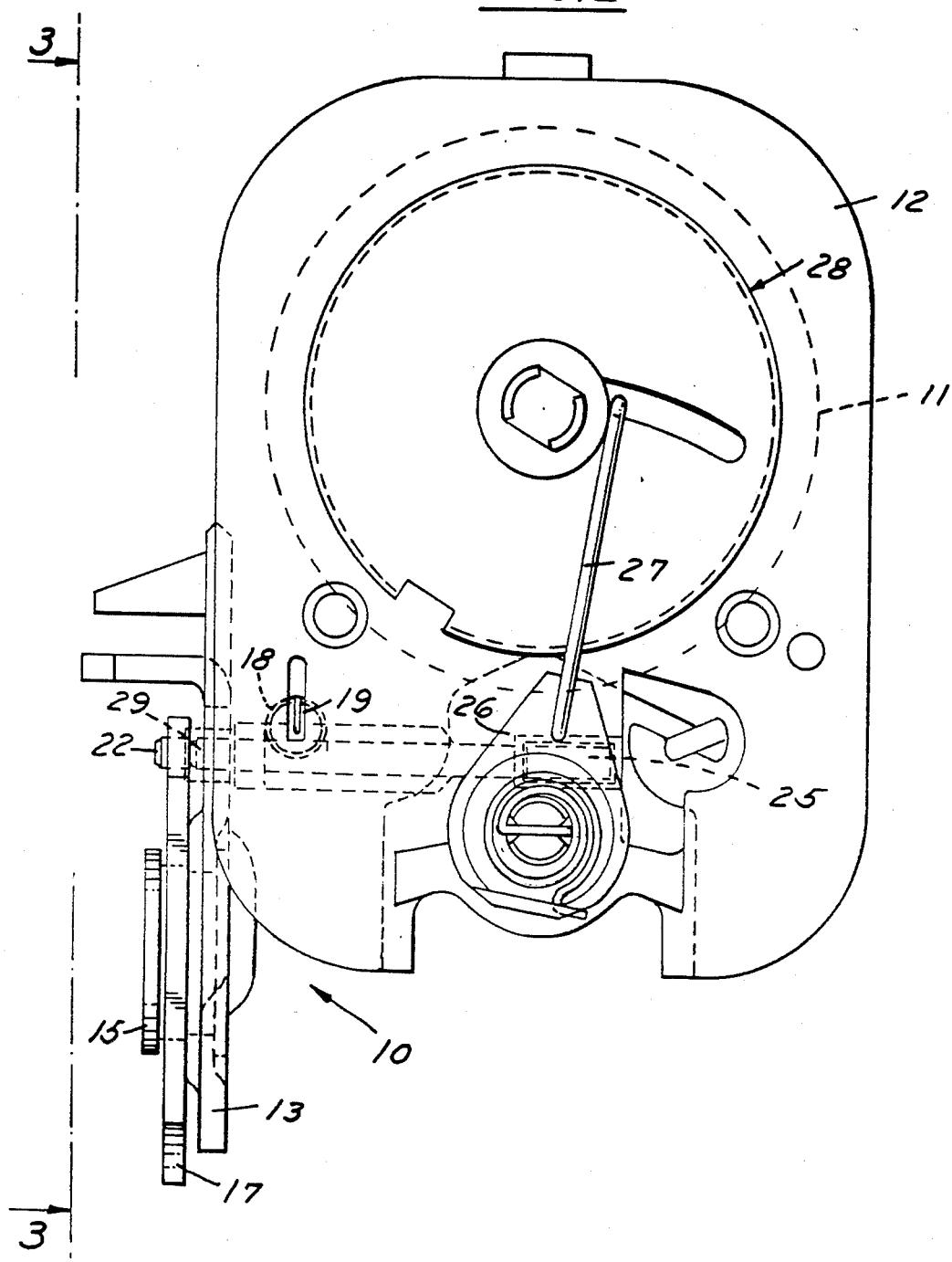
FIG. 2 is a side elevation taken along the line 2—2 of FIG. 1.
Figure 3:
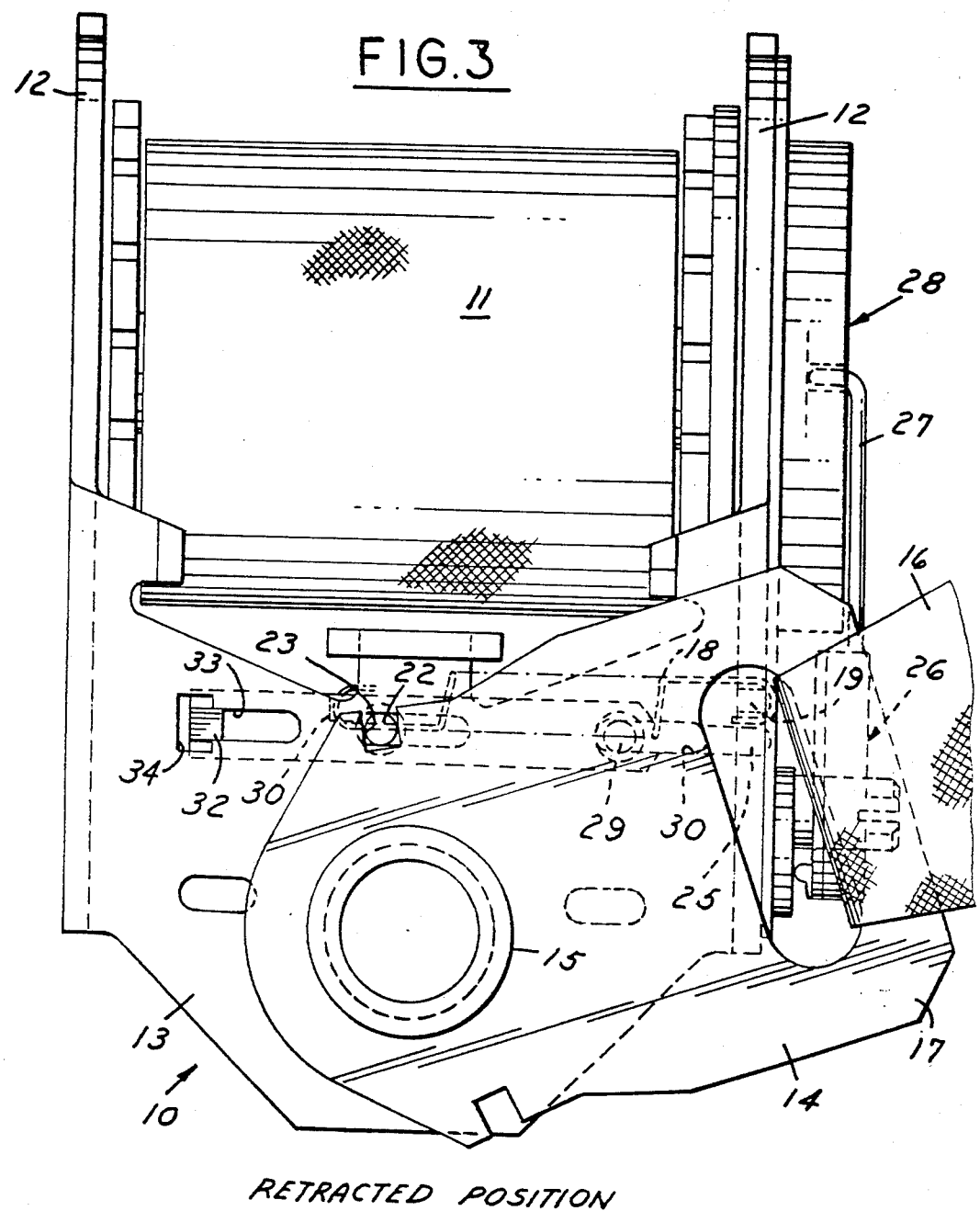
FIG. 3 is a back elevation taken along the line 3—3 of FIG. 2.

With reference to FIGS. 1-5, main frame 10 for belt retractor spool 11 includes a pair of sides 12 joined by integral base 13 upon which lap belt anchor 14 is pivotally mounted at 15. Lap belt 16, shown in relaxed condition, is fastened to slotted end 17 of anchor 14 permitting tension spring 18, anchored at frame side 19 and to projection 20 of slide 21, to actuate slide pin 22 engaging slot 23 in lap belt anchor 14 rotating the anchor to the position in FIGS. 1-4 where slide arm 24 with its projection 25 hold resilient mounting 26 for comfort feature follower 27 in disengaged relation to spiral track 28 providing conventional control for comfort feature actuation in accordance with mechanism such as disclosed in U.S. Pat. No. 4,002,311.

Figure 4:
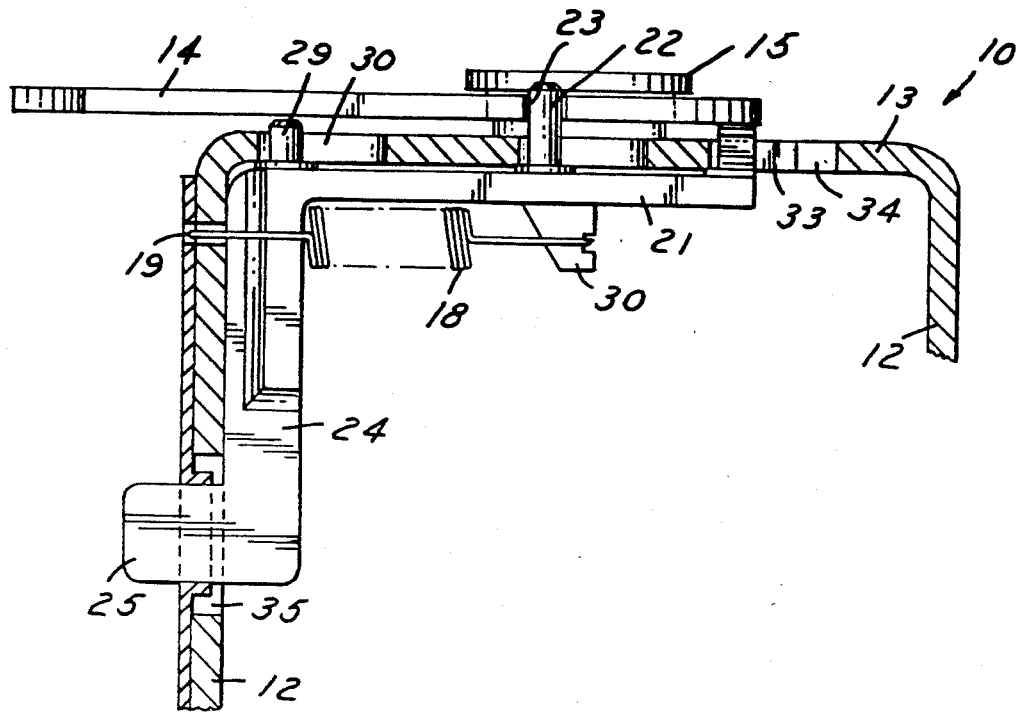
FIG. 4 is a sectional view taken along the line 4—4 of FIG. 1.
Figure 5:
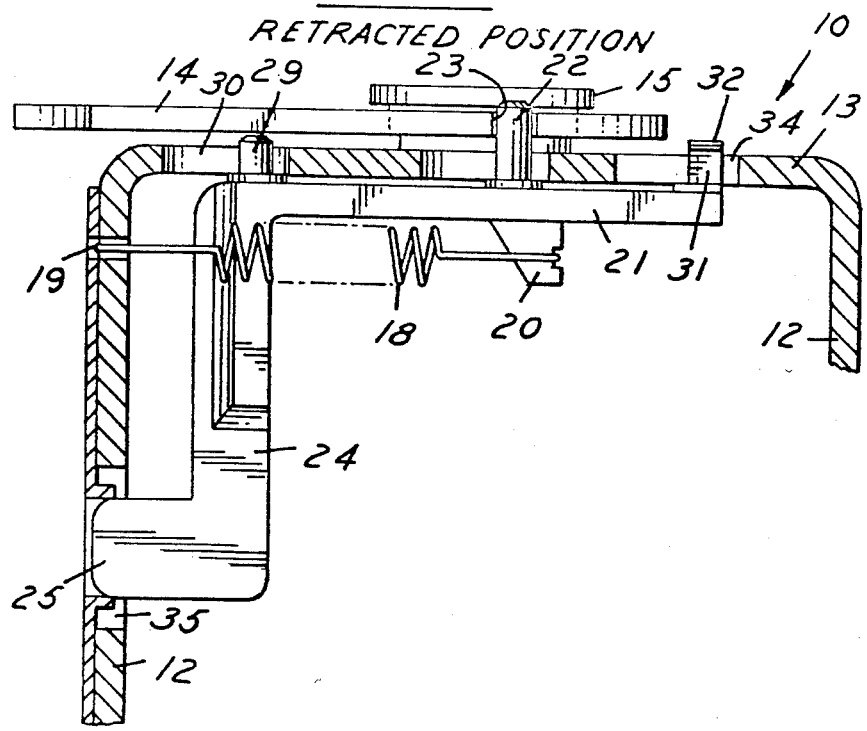
FIG. 5 is a view similar to FIG. 4 shown in retracted position.

As best shown in FIGS. 4 and 5, slide 21 is positioned on frame 10 by pin 29 engaging base slot 30 and projection 31 with retaining ears 32 engaging base slot 33 having an enlarged opening 34 for admitting assembly of retaining ears 32. Projection 25 extending through side slot 35 completes the positioning means for slide 21 for actuation by spring 18 upon relaxation of lap belt 16 and for retraction to position shown in FIG. 5 through normal lap belt tension rotating lap belt anchor 14 in a clockwise direction as seen in FIG. 1 and actuating pin 22 to move slide 21 against tension spring 18 to positions shown in FIGS. 3 and 5.

DETAILED DESCRIPTION OF PREFERRED EMBODIMENT

With reference to FIGS. 6-10, anchor 40 is pivotally mounted on frame base 41 by bushing 42 swaged at 43 and retained in full line position shown by tension spring 44 connected to base tab 45 and anchor tab 46 whenever the lap belt is relaxed by occupant diengagement. Spring 44 is extended to tab position 46a whenever lap belt tension established by occupant connection moves anchor 40 to phantom position 40a.

Figure 6:
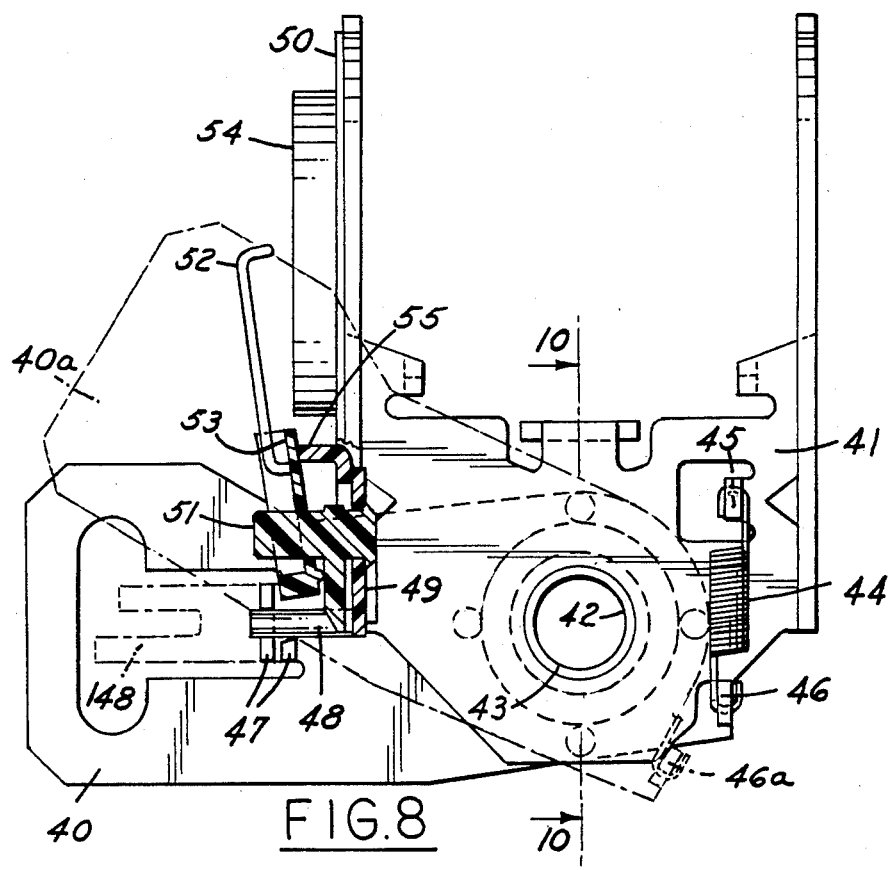
FIG. 6 is a front elevation similar to FIG. 1 illustrating a modified construction of the frame assembly with retractor spool omitted.
Figure 8:
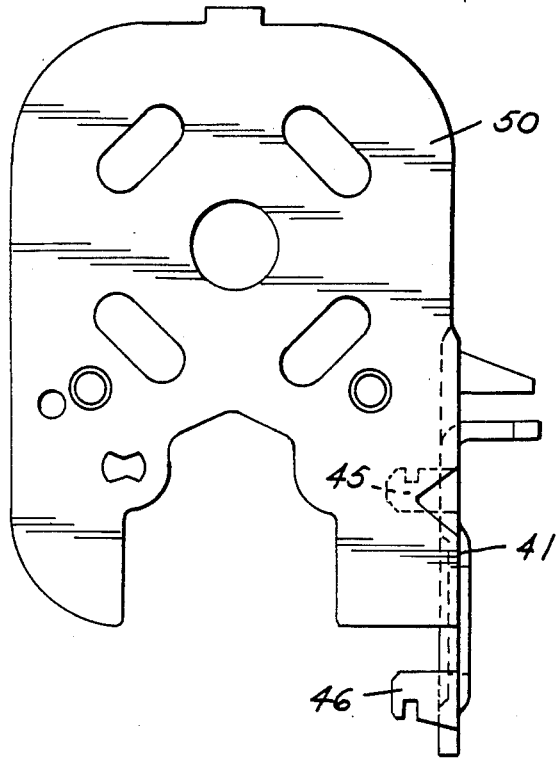
FIG. 8 is a right side elevation of the retractor frame per se of FIG. 6 omitting the other components.
Figure 7:
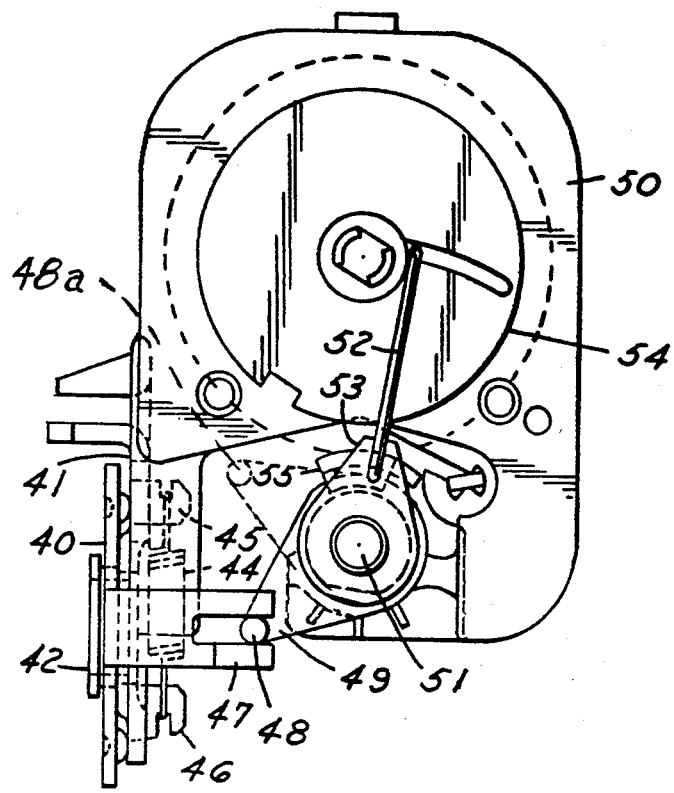
FIG. 7 is a left side elevation of the retractor frame of FIG. 6.
Figure 9:
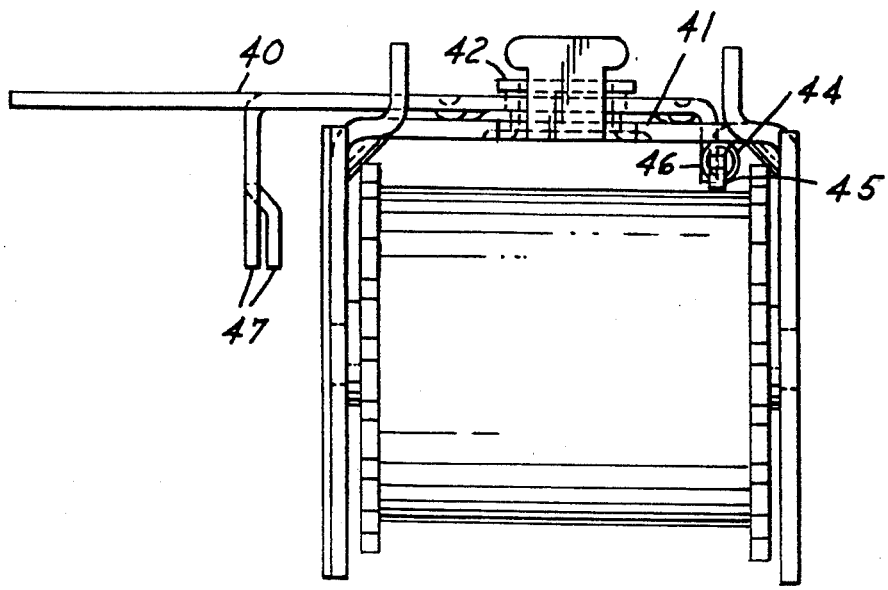
FIG. 9 is a plan view of the retractor frame per se of FIG. 6 with the retractor spool added.
Figure 10:
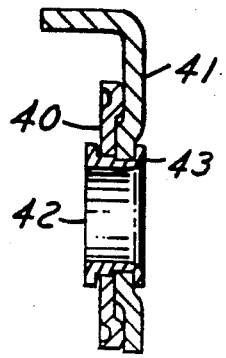
FIG. 10 is a sectional view taken along the line 10—10 of FIG. 6.

With reference to FIGS. 6 and 7, slotted anchor projection 47, shown in phantom as punched, stamped or blanked at 148 prior to forming a right angle bend, engages integral pin 48 projecting from lever arm 49 pivotally mounted on support 50 having a pivot projection 51 on which wire pawl 52 and its retainer 53 are resiliently mounted with bias urging engagement of pawl 52 with spiral cam 54. Ramp 55 formed on lever 49 extends to a level for actuating retainer 53 to the pawl disengaging position shown in FIG. 6 when pin projection 48 is moved to the solid line position shown in FIG. 7 and swings clockwise to the position shown at 48a releasing pawl 52 to its cam engaging position when anchor 40 moves to position 40a through lap belt engagement.

With either of the embodiments it will be seen that through free pivotal mounting of the lap belt anchor, it is moved to a comfort feature release position by a simple tension spring upon lap belt disengagement and to a comfort feature restoring position upon occupant lap belt engagement without the necessity for any external door responsive push button or electric solenoid as previously employed.

We claim:

1. Combination lap and shoulder belt restraining system including a mounting frame, a shoulder belt windup spool mounted in said frame, arresting means for arresting rotation of said windup spool in the windup direction to relax shoulder belt tension, means engaging the lap belt for sensing tension in said lap belt and means responsive to said sensing means for releasing said arresting means from its operative arresting condition to assure full shoulder belt retraction upon relaxation of the lap belt tension when the occupant disengages the lap belt, and means responsive to said sensing means for restoring said winding arresting means to its operative arresting condition upon tensioning of the lap belt when the occupant engages the lap belt.

2. Restraining system of claim 1 wherein said sensing means comprises a lap belt pivotal anchor means for connecting end of the lap belt and having distinct arcuate positions responsive to presence or absence of lap belt tension.

3. Restraining system of claim 2 including resilient means biasing said pivotal anchor means to comfort feature windup arresting means release position.

4. Restraining system of claim 3 wherein said releasing and restoring means comprises a slide means mounted on said frame, resilient means connected to said frame for biasing said slide to an extremity position, and slide projection means for releasing comfort feature windup arresting means from its operative position at said slide extremity.

5. Restraining system of claim 4 wherein said releasing and restoring means further comprises means responsive to pivotal movement of said anchor means upon engagement of said lap belt for moving said slide away from said extremity position.

6. Restraining system of claim 3 wherein said releasing and restoring means comprises a pivoted lever means mounted on said frame responsive to pivotal movement of said anchor means for releasing and restoring said windup arresting means from and to its operative condition.

7. Restraining system of claim 6 including spring means biasing said pivotal anchor to one distinct arcuate position when there is an absence of lap belt tension.

8. Restraining system of claim 1 wherein said windup arresting means includes a cam track rotated in response to belt protraction and retraction, and wire pawl means engageable with and disengageable from said cam track by said releasing and restoring means.

9. Restraining system of claim 8 wherein said pawl means is in the form of a resiliently mounted wire having an end formed for retractable engagement with said cam track.

* * * * *